US008811965B2

(12) United States Patent
Cohan

(10) Patent No.: US 8,811,965 B2
(45) Date of Patent: *Aug. 19, 2014

(54) SYSTEM AND METHOD FOR AUTOMATIC DATA SECURITY BACK-UP AND CONTROL FOR MOBILE DEVICES

(76) Inventor: Todd Michael Cohan, Princeton, NJ (US)

( * ) Notice: Subject to any disclaimer, the term of this patent is extended or adjusted under 35 U.S.C. 154(b) by 453 days.

This patent is subject to a terminal disclaimer.

(21) Appl. No.: 13/287,523

(22) Filed: Nov. 2, 2011

(65) Prior Publication Data

US 2012/0066738 A1    Mar. 15, 2012

Related U.S. Application Data

(63) Continuation-in-part of application No. 12/287,868, filed on Oct. 14, 2008, now Pat. No. 8,107,944.

(51) Int. Cl.
*H04M 3/00* (2006.01)
*H04M 3/42* (2006.01)

(52) U.S. Cl.
USPC ...... 455/418; 455/419; 455/420; 379/207.02; 379/207.03

(58) Field of Classification Search
USPC ......... 455/418, 419, 420; 379/207.02, 207.03
See application file for complete search history.

(56) References Cited

U.S. PATENT DOCUMENTS

| 7,069,003 | B2 | 6/2006 | Lehikoinen |
| 7,516,219 | B2 * | 4/2009 | Moghaddam et al. ........ 709/225 |
| 2005/0075097 | A1 | 4/2005 | Lehikoinen |
| 2005/0113130 | A1 * | 5/2005 | Weinzierl .................. 455/550.1 |
| 2007/0111704 | A1 | 5/2007 | Linkert et al. |
| 2007/0281664 | A1 | 12/2007 | Kaneko et al. |
| 2007/0299631 | A1 | 12/2007 | Macbeth et al. |
| 2008/0233919 | A1 | 9/2008 | Kenney |

* cited by examiner

*Primary Examiner* — Omoniyi Obayanju
(74) *Attorney, Agent, or Firm* — Triangle Patents, PLLC

(57) ABSTRACT

Systems and methods for providing security and control of mobile communications device activity including at least one mobile communication device with software operable thereon for receiving rules provided by an authorized user of the device(s) and in accordance with those rules administering actions to provide for controlling and security data stored or generated on the device(s), including logging data and activities related to the mobile communications device, blocking and filtering calls, messages, websites, emails, and combinations thereof, via wireless communication with a remote server computer having a corresponding software module operable thereon for managing and implementing the rules.

23 Claims, 2 Drawing Sheets

SYSTEM AND METHOD FOR AUTOMATIC
DATA SECURITY BACK-UP AND CONTROL
FOR MOBILE DEVICES

CROSS-REFERENCE TO RELATED APPLICATIONS

This non-provisional utility patent application is related to the prior filed co-pending non-provisional application as a continuation-in-part:
U.S. application Ser. No. 12/287,868 entitled "SYSTEM AND METHOD FOR AUTOMATIC DATA SECURITY, BACK-UP AND CONTROL FOR MOBILE DEVICES" filed on. Oct. 14, 2008.

BACKGROUND OF THE INVENTION

1. Field of the Invention

The present invention relates generally to data security, back-up, logging, monitoring and control for mobile communication devices. Further, the present invention relates to mobile communication devices and remote access and automatic control for data security, back-up, and logging based on user-defined rules and the systems, and methods relating thereto.

2. Description of the Prior Art

Generally, it is known in the relevant art to provide systems and methods for communication record logging, mobile web log related to device activity, and data back-up. Also, generally it is known in the relevant art to provide for security related to mobile devices, including portable computers and mobile communication devices and personal digital assistant (PDA) devices. By way of example, the following US Patents and published pending US Patent Applications are provided:

U.S. Pat. No. 7,069,003 by Lehikoinen, et al., issued Jun. 27, 2006, and corresponding published pending application no. 20050075097 published Apr. 7, 2005, for Method and apparatus for automatically updating a mobile web log (blog) to reflect mobile terminal activity, which provides for a mobile terminal including a memory storing application software and data that is descriptive of the use of the mobile terminal, a display and controller that is responsive to the application software and to at least a sub-set of the stored data for visualizing on the display, in graphical form, the use of the mobile station over time.

US Patent Application Publication No. 20070111704 by Linkert, et al., published May 17, 2007 for System and method for communication record logging, which discloses a method for maintaining a log of communications initiated or received at a portable electronic device, including short message service (SMS) messages, personal identification number (PIN) messages, and cellular telephone calls, wherein the method includes receiving a data record from each of the communications, extracting information from the data record, and storing information in a log file.

US Patent Application Publication No. 20070281664 by Kaneko, et al., published Dec. 06, 2007 for Portable wireless terminal and its security system, teaching a portable wireless terminal, like a cellular phone, and its security system for preventing by remote control improper use of the portable wireless terminal by a third party when it is lost or stolen, including data back-up to a remote center by remote control from the center via a wireless network, and including encryption, public-private key, and data fragmentation.

US Patent Application Publication No. 20070299631 by Macbeth, et al., published Dec. 27, 2007 for Logging user actions within activity context, including maintaining a log of user keystrokes, files accessed, files opened, files created, websites visited, communication events, for example phone calls, instant messaging, communications, etc.

US Patent Application Publication No. 20080233919 by Kenney, published Sep. 25, 2008 for System and method for limiting mobile device functionality, disclosing mechanisms for selectively disabling mobile device functionality to prevent unauthorized access to personal data stored on the mobile device, like bank account numbers, social security numbers, and credit card numbers. Thus there remains a need for systems and methods that provide for automatically controlling data security, back-up, logging, access and for providing remote access to the data back-up and mobile communication device operation, based upon user-defined rules for such automation, rather than merely providing security for the incidence of lost or stolen mobile communication devices.

SUMMARY OF THE INVENTION

A first aspect of the present invention includes methods for automatically providing control and security for mobile communication devices and data created and/or stored thereon, including steps of logging data and activities related to the mobile communications device, blocking and filtering calls, SMS messages, MMS messages, (photos) Instant Messages, websites, emails, and combinations thereof, via wireless communication with a remote server computer having a corresponding software module operable thereon for managing and implementing rules that are initially selected or generated by authorized user(s) of the device(s). Different levels of access and rules authority are preferably provided for different users, such as a first user being a system administrator or parent having one level and a device user or child having a second, lower grade level that is subjected to limitations based on the first user, all for the same device.

A second aspect of the present invention is to provide a system having at least one mobile communication device with software operable thereon for receiving rules provided by an authorized user of the device(s) and in accordance with those rules administering actions to provide for controlling and securing data stored or generated on the device(s), including logging data and activities related to the mobile communications device, blocking and filtering calls, voicemail, SMS messages, MMS messages, (photos), Instant Messages, websites, emails, social media applications such as Facebook, LinkedIn, Twitter and the like and combinations thereof, via wireless communication with a remote server computer having a corresponding web-based software module operable thereon for managing and implementing the rules. The web-based software will also be used to access the logs, records for device activities including applications and enable/disable device locking options.

None of the prior art references provide for authorized user-based rules selection, modification and remote management and implementation for mobile communications devices to include rules governing all aspects of data security and device security, such as data back-up, device operation and access to predetermined numbers, contacts, and/or websites or addresses, device receipt of calls, messages, SMS messages, MMS messages, (photos), Instant Messages, social media applications such as Facebook, LinkedIn, Twitter and the like and websites from predetermined or all numbers, contacts, and/or websites or addresses for predetermined duration or dates/times, in addition to device locking and application control and management.

These and other aspects of the present invention will become apparent to those skilled in the art after a reading of the following description of the preferred embodiment when considered with the drawings, as they support the claimed invention.

DETAILED DESCRIPTION

Figure 1:
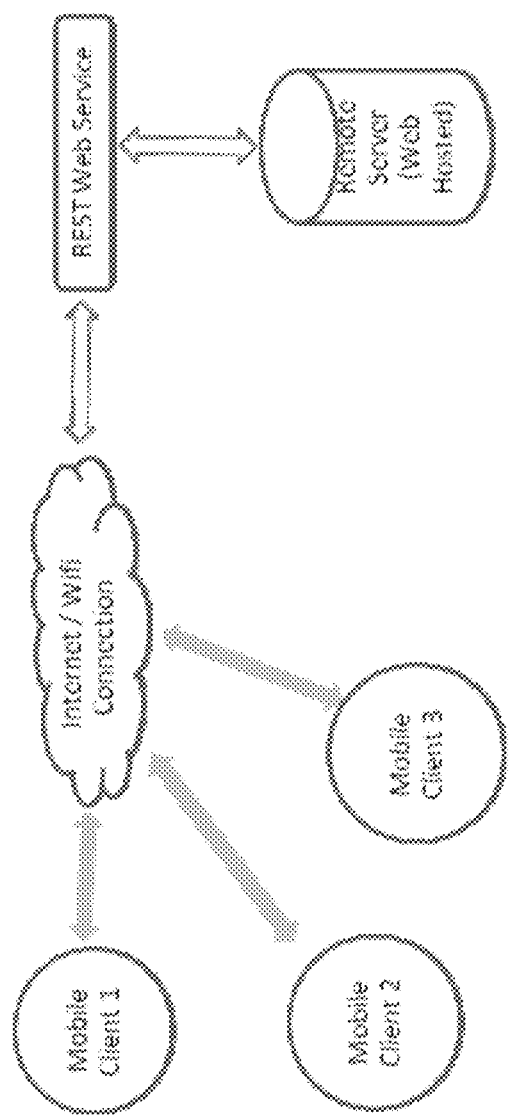
FIG. 1 illustrates a schematic diagram illustrating one embodiment of the system according to the present invention.

Referring now to the drawings in general, the illustrations are for the purpose of describing a preferred embodiment of the invention and are not intended to limit the invention thereto.

The present invention provides for a system having at least one mobile communication device with software operable thereon for receiving rules provided by an authorized user of the device(s) and in accordance with those rules administering actions to provide for controlling and security data stored or generated on the device(s), including logging data and activities related to the mobile communications device, blocking and filtering calls, messages, SMS messages, MMS messages, (photos), Instant Messages, social media applications such as Facebook, LinkedIn, Twitter and the like, websites, emails, and combinations thereof, via wireless communication with a remote server computer having a corresponding software module operable thereon for managing and implementing the rules. Accordingly, FIG. 1 illustrates a schematic diagram illustrating one embodiment of the system according to the present invention, including a remote server computer (RSC), wireless network communication signals, a REST based web service to connect mobile device to RSC, and at least one mobile device in communication with the RSC, data stored in memory on the device(s) and having back-up data stored in memory at the RSC. One of ordinary skill will understand and appreciate that other computer components including processors, input/output devices and displays with graphical user interface operability are included in the system for providing user inputs and for reviewing status indication of the rules and status of implementation on device (s) via remote access or direct access to the server through a network via the target device or other non-target devices not governed by the rules.

Figure 2:
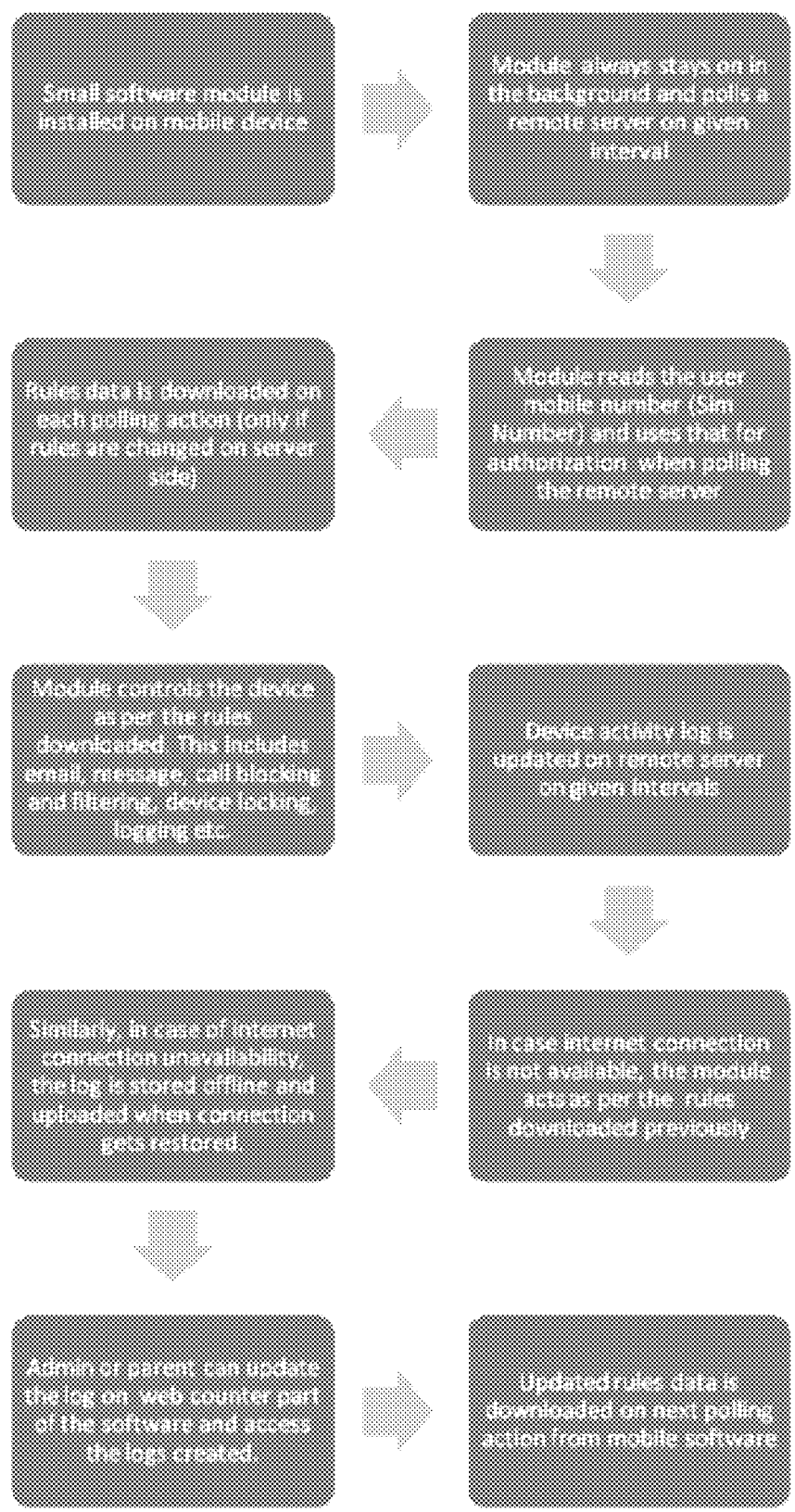
FIG. 2 shows a flow diagram illustrating steps involved with methods of the present invention.

Additionally, the present invention provides methods for providing automatic control and security for mobile communication devices and data created and/or stored thereon based upon rules selected by an authorized user of the device, including steps of providing software operable on the device for logging data and activities related to the mobile communications device, blocking and filtering communication, including data and voice conversations in real-time and voice-mail left on the carrier network, calls, messages, SMS messages, MMS messages, (photos), Instant Messages, social media applications such as Facebook, LinkedIn, Twitter and the like, websites, emails, and combinations thereof, via wireless communication with a remote server computer and system as set forth hereinabove. FIG. 2 shows a flow diagram illustrating steps involved with methods of the present invention, providing the software program module operable on the mobile communication device, and steps associated with associating an authorized user(s) with the device as set forth hereinbelow, the software program module operating with the following steps: being activated upon installation or download and operating substantially continuously for polling and/or communication with a remote server computer, downloading rules from the server including initial rules and rules updates as available, administering the rules for controlling the device operation, uploading data to the server, wherein the data includes activity log, activity data, duration, frequency, content, etc., storing select data on the device, storing select data only when the device is offline, and combinations thereof. The present invention further provides for forwarding the data in a customizable format, making it readable and searchable to a third-party vendor or to the customer's server on premises. Thus, the device software and the RSC provides for all SMS messages, Instant Messages, (chat), MMS messages, (photo), social media applications such as Facebook, LinkedIn, Twitter and the like, voice conversations and voice-mail left on the carrier network to be captured, logged, archived and made searchable by the customer via the graphical user interface or sent to a third-party provider or to customers premise.

Preferably, the steps include an authorized user associated with at least one mobile communication device or an administrator establishing rules governing the operation of the functions of the system for providing data and device security and remote access to same by the authorized user. The rules may be selected from predetermined options or generated uniquely by the user and input to the system by the authorized user following an authentication and/or authorization step. The device-operable software functions to provide the steps according to those rules, including but not limited to logging and storing data input and/or generated on the mobile communication device, blocking and/or filtering phone calls, messages, and/or websites, archiving data and tagging it for retrieval and optional searchability, auditing and reporting and locking the device from predetermined selected or all activity for a duration or programmed date(s) and corresponding time(s).

In preferred embodiments of the present invention, the rules for all functionality of the software and corresponding device security and data security and all associated activities are defined by the authorized user(s) of the device or the device owner or administrator. In the case of corporate or business mobile communications, the device authorized user may have a first predetermined level of rules options for selection and implementation, and a system administrator or supervisor may have a second predetermined level of rules options that provide for overriding and/or limiting selections of the actual device user. Similarly, in the case of minor children, a child device authorized user may have a first predetermined level of rules options and the parent(s) may have a second predetermined level of rules options that provide for administrative authorization and access to the data back-up, as well as blocking and filtering and device locking functions. For example, the second predetermined level of rules may include: remote wipe/erase of the device, remote lock of the device, clearing and resetting the password, preventing certain applications from being installed and/or deleted and locking use of camera and the like.

Other examples include the device software and RSC providing mobile applications to be installed, uninstalled and managed remotely over the network directly to the mobile device. The system and device tracks and controls approved and unapproved applications being installed on the device and ensures users install approved applications. Also the system and device manage, lock, and permit users to access specific web-based applications, mobile applications and SaaS services and internet sites. The device software and RSC further provides for remote control of which devices are permitted or prohibited to connect to an internal network.

The device software and the RSC according to the present invention also provide for a "push" notification prompting the device to check in for tasks, policies and queries.

A complete inventory management of the devices which have the device software installed and are "connected" to the RSC is provided for, including user authentication, certificate enrollment and device configuration.

In any case, the rules can be selected, generated and input to the system through a web-based user interface accessible by any web-enabled device, including but not limited to the target mobile communication device(s) to which those rules would apply. Additionally, rules may be updated, modified, reviewed, and eliminated by authorized users through the same type of user interface via the web, regardless of device access. As will be understood and appreciated, user authentication and authorization may be provided in a number of ways, including, by way of example and not limitation, a user identification (userID) and corresponding password, passcode, or personal identification number (PIN). Additional authorized users can be added or removed through this system only if an authorized user accesses the system securely with the userID and corresponding passcode. Biometric authentication and other forms of user identification and authentication may be provided in substitute or supplement as appropriate. Preferably, the rules are administered via software operable from the RSC side, thereby providing a smaller software footprint operable on the device, i.e., providing a client side application as a small utility installed or downloaded on the mobile communication device upon registration with the system; in this manner, the application can always be operable or "on" to manage implementation of the rules on the device(s) without interfering with regular operation or draining power or memory in a significant manner. The client side application is operable to poll the RSC on regular and predetermined intervals for checking for new rules data, uploading logs from the device to the RSC, and functioning to conform to any other rules associated directly with that device. A single authorized user can add multiple devices in the system and thus control more than one device from within the same interface. This way, in corporate environments, a single admin can control all devices of the organization and similarly the parents can control devices for all children. Unlike prior art logging functions for remote communication devices, the present invention logging extends beyond SMS messaging, MMS messaging, IM messaging, social media applications such as Facebook, LinkedIn, Twitter and the like, call activity logging, i.e., identifying what calls and SMS messages originate on the device or that were received or calls missed to that device. The present invention provides for logging of SMS messages, MMS messages, and telephone calls and recordings left on the carrier network, including inbound or outgoing, and preferably includes additional data associated therewith (the call timers, name data from contacts and so on), including rules implementation such as call time limitation to predetermined numbers or recipients. Also, logging includes information relating to browsing history, including website information and URL, duration and frequency of website visit, downloading history, and other similar activities. Also, text messaging email messaging, MMS messaging, (photos) and $3^{rd}$ party chat application data and social media applications such as Facebook, LinkedIn, Twitter and the like are included in the logging functions of the present invention. Importantly, with the automated rules implementation including back-up of data and logging information, the present invention provides for the elimination of stored data on the mobile communications device since the device can actively connect with the RSC for retrieving data rather than storing data on the device directly. The data is stored on device on temporary basis if the internet connection is not available and is uploaded to RSC when connection is restored. When uploading the system maintains a parity check for upload activity and unless the data is uploaded successfully, the transactions are not considered as complete. Rules governing data retained on the device in the case of limited wireless connectivity but need for access to certain predetermined information are preferably provided.

Additionally, the RSC controls device security by providing for blocking and filtering of calls, SMS messages, MMS messages, Instant Messages, Social Media messages, $3^{rd}$ party chat applications, banking transactions and URLs based upon the rules. Either predetermined or all numbers or initiators can be blocked from sending communication, data, messages, or calls to the device(s). Also, keywords, key phrases and number sequences can be used as the basis for blocking and/or filtering as well. Selective or all URL blocking or filtering of websites based upon URL, owner, content, etc. is also provided, based upon the rules.

In preferred embodiments, the RSC and software associated with the server side module of the present invention provide for scalability without limitation to number of devices and geographic locations, networks, etc. Initial embodiments provide for software supporting Windows Mobile, Google Android, Symbian and RIM Blackberry and Apple iOS devices that are commercially available globally; however, platforms, devices, and operating systems of mobile communications devices can be addressed through software modifications for compatibility and improvements, as well as new devices. The RSC software is designed in consideration to add more platforms and no changes are required on server side software when adding new mobile platforms.

The present invention also further provides for mobile communication device having automated security and control of device functionality including: a mobile device with a software program module operable thereon, wherein the module administers rules that govern device functionality, including filtering and blocking communication to and/or from the device, logging device activity, storing data associated with device activity, including activity frequency, duration and content, and combinations thereof; as well as other functionality set forth hereinabove relating to those aspects of the system applicable at the device level.

Additionally, the system can filter and block such information as passwords or identification numbers such as social security numbers from leaving the device and alert the administrator to these. The system may also similarly filter, block and alert for PING probes. A policy of flagging words, phrases or number sequences can be used to enhance the security of the device.

Certain modifications and improvements will occur to those skilled in the art upon a reading of the foregoing description. By way of example, the blocking and filtering steps may extend beyond phone calls, SMS messages, IM messages MMS messages, Social Media messages, emails, and websites to further include blocks and filtering of advertising, location information, transactions including commercial transactions, money transactions and solicitations of any form to the mobile communication device, based upon the rules selected and/or predetermined by the authorized user of the device. Similar options for backup and restore of contacts, calendar and other vital data are also available. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A mobile communication device having automated security and control of device functionality comprising:
   a mobile device including processors, input/output devices, memory and displays with graphical user interface operability for providing user inputs and for reviewing status indication of rules and status of implementation on device(s) via remote access or direct access to a server through a network;
   the mobile communication device with a software program module operable thereon,
   wherein the module administers rules that govern and control device functionality, including:
   filtering and blocking communication, data back-up and/or storage, and logging SMS messages, IM messages, MMS messages, emails, phone calls and voicemail, network browsing and/or downloading history, and text-based communication storing select data only when the device is offline, archiving data, including content data, and tagging it for retrieval and searchability, and combinations thereof; wherein the communication including all data and voice conversations in real-time and voicemail left on the network to and/or from the device, logging device activity, including third-party applications installed on the device which may be transmitting both data and voice, storing data associated with device activity, including activity frequency, duration and content, and combinations thereof; and archiving data, including content data, and tagging it for retrieval and searchability; wherein the device software is operating substantially continuously for polling the server for updates;
   and wherein the device is operable for automatically communicating with the server having corresponding server software program for controlling device functionality based upon rules established by the authorized user(s), and automatically activating device functionality based upon rules downloaded from the server, including initial rules and updated rules as available.

2. The device of claim 1, wherein the rules provide for predetermined numbers and/or websites to be blocked.

3. The device of claim 1, wherein the rules provide for only cleared numbers to not be blocked to/from device communication.

4. The device of claim 1, wherein the device software provides for the device to be in regular communication with a remote server computer (RSC), which provides for initial rules and for rules updates.

5. The device of claim 4, wherein the device software provides for uploading data from the device to the RSC, including logging device activity and storing data associated with device activity, including activity frequency, duration and content, attached content and combinations thereof, and forwarding the data in a customizable format, making it readable and searchable to a third-party vendor or to the customer's server on premises.

6. The device of claim 1, wherein the blocking includes blocking of advertising, location information, commercial transactions, solicitations and combinations thereof.

7. The device of claim 1, wherein the device software provides for remote erase of the device, remote lock of the device, clearing and resetting the password, and locking use of camera, all via the server.

8. The device of claim 1, wherein the device software provides for mobile applications to be installed, uninstalled and managed from the GUI over the network directly to the mobile device.

9. The device of claim 4, wherein the device software provides for remote control via the RSC for management, locking, and permitting of users to access specific web-based applications and SaaS services and Internet sites, and wherein the device software provides for remote control via the RSC for the device to be permitted or prohibited to connect to an internal network.

10. The device of claim 4, wherein the device software provides for a "push" notification via the RSC, prompting the device to check in for tasks, policies and queries.

11. The device of claim 4, wherein the device software provides a certificate enrollment process via the RSC which is used to identify the user's device to authenticate the device on the network.

12. The device of claim 4, wherein the device software provides for management via the RSC of the devices which have the device software installed and are connected to the RSC; the management actions selected from the group consisting of user authentication, certificate enrollment, device configuration and combinations thereof.

13. The device of claim 4, wherein the device software provides via the RSC for the voice conversation and voicemail left on the network to be captured, logged, archived and made searchable by the customer via the graphical user interface or sent to a third-party provider or to customer's premise.

14. A system for providing mobile communication security and control comprising:
   a remote server computer (RSC) and at least one mobile device in communication with the RSC;
   a web service to connect the mobile device to RSC, data stored in memory on the device(s) and having back-up data stored in memory at the RSC; the RSC and mobile device including processors, input/output devices, memory and displays with graphical user interface operability for providing user inputs and for reviewing status indication of the rules and status of implementation on device(s) via remote access or direct access to the server through a network;
   the mobile communication device and server running a software program, the software program operable on the mobile communication device for performing the following functions:
   associating an authorized user(s) with the device, communicating with the remote server computer (RSC) having corresponding server software program operable thereon for communicating rules to the device software program for controlling device functionality;
   wherein the rules are established by the authorized user(s); activating device functionality based upon rules downloaded from the RSC, including initial rules and updated rules as available;
   operating substantially continuously for polling and/or communication with the RSC, administering the rules for controlling the device operation, including blocking, filtering, data back-up and/or storage, and logging SMS messages, 1M messages, MMS messages, emails, social media applications and phone calls including voice conversations in real-time and voicemail left on the network to and/or from the device, network browsing and/or downloading history, and text-based communication; uploading data to the server, wherein the data includes activity log, activity data, activity duration, activity frequency, activity-associated content including third-party applications installed on the device which may be transmitting both data and voice, storing select data on the device, storing select data only when the device is offline, and combinations thereof; and archiving data, including content data, and tagging it for retrieval and searchability, auditing and reporting.

15. A method for providing mobile communication control comprising the steps of:

providing a remote server computer (RSC) and at least one mobile communication device in communication with the RSC; a web service to connect the mobile device to RSC, data stored in memory on the device(s) and having back-up data stored in memory at the RSC; the RSC and mobile device including processors, input/output devices, memory and displays with graphical user interface operability for providing user inputs and for reviewing status indication of the rules and status of implementation on device(s) via remote access or direct access to the server through a network; the mobile communication device and server running a software program, wherein the software program includes a module operable on the mobile communication device, the module further performing the steps comprising:

associating an authorized user(s) with the device;

automatically communicating with the remote server computer (RSC) having corresponding server software program for controlling device functionality based upon rules established by the authorized user(s);

automatically activating device functionality based upon rules downloaded from the RSC, including initial rules and updated rules as available;

operating substantially continuously for polling and/or communication with the RSC, administering the rules for controlling the device operation, including blocking, filtering, data back-up and/or storage, and logging SMS messages, IM messages, MMS messages, emails, phone calls and voicemail, network browsing and/or downloading history, and text-based communication;

uploading data to the server, wherein the data includes activity log, activity data, activity duration, activity frequency, activity-associated content, storing select data on the device, storing select data only when the device is offline, and combinations thereof; and archiving data, including content data, and tagging it for retrieval and searchability.

16. The method of claim 15, wherein the device software provides for remote erase of the device, remote lock of the device, clearing and resetting the password, and locking use of camera.

17. The method of claim 15, wherein the device software and RSC provides mobile applications to be installed, uninstalled and managed from the GUI over the network directly to the mobile device.

18. The method of claim 15, wherein the device software and RSC manages, locks, and permits users to access specific web-based applications and SaaS services and Internet sites.

19. The method of claim 15, wherein the device software and RSC provides for remote control of which devices are permitted or prohibited to connect to an internal network.

20. The method of claim 15, wherein the device software and the RSC provides for a "push" notification prompting the device to check in for tasks, policies and queries.

21. The method of claim 15, wherein the device software and the RSC provides a certificate enrollment process which is used to identify the user's device to authenticate the device on the network.

22. The method of claim 15, wherein the device software and the RSC provides for management of the devices which have the device software installed and are connected to the RSC; the management actions selected from the group consisting of user authentication, certificate enrollment, device configuration and combinations thereof.

23. The method of claim 15, wherein the device software and the RSC provide for the voice conversation and voicemail left on the network to be captured, logged, archived and made searchable by the customer via the graphical user interface or sent to a third-party provider or to customer's premise.

* * * * *